(12) United States Patent
Powell et al.

(10) Patent No.: US 10,873,287 B2
(45) Date of Patent: Dec. 22, 2020

(54) APPARATUS AND METHOD FOR ATTACHING SIGNS TO FOUNDATION MEMBERS SUCH AS ROAD BARRIERS

(71) Applicants: POWELL (RICHMOND HILL) CONTRACTING LIMITED, Gormley (CA); STINSON EQUIPMENT LIMITED, Concord (CA); AMG METALS INC., Newmarket (CA)

(72) Inventors: Ben Powell, Sharon (CA); James Delamere, Toronto (CA); John David Pierson, Newmarket (CA); Mohammad Bagher Vakili, Toronto (CA)

(73) Assignee: Stinson Equipment Limited, Ontario (CA)

(*) Notice: Subject to any disclaimer, the term of this patent is extended or adjusted under 35 U.S.C. 154(b) by 0 days.

(21) Appl. No.: 15/572,534

(22) PCT Filed: May 24, 2016

(86) PCT No.: PCT/CA2016/050585
§ 371 (c)(1),
(2) Date: Nov. 8, 2017

(87) PCT Pub. No.: WO2016/187710
PCT Pub. Date: Dec. 1, 2016

(65) Prior Publication Data
US 2018/0131313 A1    May 10, 2018

(30) Foreign Application Priority Data
May 25, 2015  (CA) ...................................... 2892412

(51) Int. Cl.
*H02S 20/21*    (2014.01)
*F16M 11/08*   (2006.01)
(Continued)

(52) U.S. Cl.
CPC .............. *H02S 20/21* (2014.12); *E01F 9/669* (2016.02); *G08G 1/0955* (2013.01); *G09F 7/18* (2013.01);
(Continued)

(58) Field of Classification Search
CPC ......... H02S 20/21; G08G 1/0955; G09F 7/18; G09F 9/30; G09F 9/305; G09F 15/005;
(Continued)

(56) References Cited

U.S. PATENT DOCUMENTS

| 3,553,645 A | * | 1/1971 | Finkel | ................... G09F 11/025 |
| | | | | 340/907 |
| 4,037,824 A | | 7/1977 | Whitmer | |

(Continued)

FOREIGN PATENT DOCUMENTS

| CA | 2178827 A1 | 6/1995 |
| CA | 2892412 A1 | 11/2016 |

(Continued)

OTHER PUBLICATIONS

Supplementary European Search Report dated Dec. 13, 2018.
(Continued)

*Primary Examiner* — Anita M King
(74) *Attorney, Agent, or Firm* — Caesar Rivise, PC

(57) ABSTRACT

A support system for a sign mountable on at least two spaced apart foundation members, the system comprising: i) a base, preferably a length adjustable base, having a first end and a second end; ii) a vertical sign support having a first end and a second end wherein the second end is connected to the base; iii) a first foundation member bracket for connection to a first foundation member, the first foundation member bracket proximate the first end of the base; and iv) a second foundation member bracket for connection to a second foundation member distant the first foundation member, the
(Continued)

second foundation member bracket proximate the second end of the base.

15 Claims, 13 Drawing Sheets

(51) Int. Cl.
    *F16M 13/02*     (2006.01)
    *G09F 27/00*     (2006.01)
    *G09F 15/00*     (2006.01)
    *G08G 1/0955*     (2006.01)
    *E01F 9/669*     (2016.01)
    *G09F 19/22*     (2006.01)
    *G09F 9/30*     (2006.01)
    *G09F 7/18*     (2006.01)
    *G09F 9/305*     (2006.01)

(52) U.S. Cl.
    CPC ............... *G09F 9/30* (2013.01); *G09F 9/305* (2013.01); *G09F 15/005* (2013.01); *G09F 15/0062* (2013.01); *G09F 19/22* (2013.01); *G09F 19/228* (2013.01); *G09F 27/007* (2013.01); *F16M 11/08* (2013.01); *F16M 13/02* (2013.01); *G09F 2009/3055* (2013.01)

(58) Field of Classification Search
    CPC .... G09F 15/0062; G09F 19/22; G09F 19/228; G09F 27/007; G09F 2009/3055; F16M 11/08; F16M 13/02
    See application file for complete search history.

(56) References Cited

U.S. PATENT DOCUMENTS

| | | | |
|---|---|---|---|
| 4,050,401 A | | 9/1977 | Kelly |
| 5,029,670 A | | 7/1991 | Whitmer |
| 5,219,105 A | * | 6/1993 | Kravitz ................... B60R 9/06 224/500 |
| 5,307,897 A | | 5/1994 | Turner et al. |
| 5,339,475 A | | 8/1994 | Jaeger et al. |
| 5,346,036 A | | 9/1994 | Arisman et al. |
| 5,472,162 A | | 12/1995 | Mason |
| 5,819,455 A | * | 10/1998 | Tsuda ........................ G09F 9/33 40/580 |
| 6,107,941 A | * | 8/2000 | Jones ................... G08G 1/0955 116/63 R |
| 6,237,883 B1 | | 5/2001 | Levin et al. |
| 6,591,574 B2 | * | 7/2003 | Humphrey ............... E04G 13/00 248/200.1 |
| 6,637,363 B2 | * | 10/2003 | Schmitt ................... B63B 19/02 114/343 |
| 6,718,672 B1 | | 4/2004 | Wieringa |
| 7,163,083 B2 | | 1/2007 | Argoud |
| 7,233,259 B2 | * | 6/2007 | Gibson .................. G08B 5/006 340/907 |
| 7,503,135 B2 | * | 3/2009 | Chafin ..................... G09F 21/04 224/405 |
| 7,621,493 B2 | * | 11/2009 | Vermette ................... B60R 9/10 224/500 |
| 8,640,370 B2 | | 2/2014 | Mandl et al. |
| 8,726,552 B2 | * | 5/2014 | Larsen .................... G09F 21/04 224/509 |
| 8,814,209 B1 | * | 8/2014 | Way ........................ B60R 11/06 224/519 |
| 2008/0307684 A1 | | 12/2008 | Ulloa et al. |
| 2013/0247435 A1 | * | 9/2013 | Bacik ...................... G09F 23/00 40/606.03 |
| 2018/0103240 A1 | * | 4/2018 | Barnes .................... E01F 9/646 |
| 2020/0048848 A9 | | 2/2020 | Powell et al. |

FOREIGN PATENT DOCUMENTS

| | | |
|---|---|---|
| CA | 2892412 A1 | 11/2016 |
| EP | 2105907 A2 | 9/2009 |
| EP | 2105907 A3 | 10/2009 |
| ES | 2293771 A1 | 3/2008 |

OTHER PUBLICATIONS

International Search Report for PCT/CA2017/050766 dated Sep. 29, 2017.
English-language abstract of CA 2892412 (2016).

* cited by examiner

APPARATUS AND METHOD FOR ATTACHING SIGNS TO FOUNDATION MEMBERS SUCH AS ROAD BARRIERS

FIELD OF THE DISCLOSURE

The present disclosure relates to the attachment of signs, and other equipment, to a foundation, preferably road barriers, in particular concrete road barriers, and in particular a support, for a portable variable message sign, that may be rapidly deployed onto a temporary road barrier.

BACKGROUND

Currently, road signs, and in particular portable variable message signs (PVMS) used on roadways during road construction or when traffic is being redirected, require permanent footings, typically permanent concrete footings, or a portable trailer requiring protection from traffic. Permanent signs cannot be installed cost-effectively for temporary application and do not typically allow for rapid deployment due to the requirement of permanent concrete footings. Portable trailer mounted signs are restricted in sign size and require protection from traffic as well as requiring a wide enough base and ballast to prevent toppling of the sign, due to high winds, wind turbulence or the like. Furthermore the current systems do not allow for rapid relocation of the signs, upon completion of the work or redirection of traffic, to another site. Other temporary road signs have a frame constructed of wood which is secured to the ground by sand bags or the like. The above systems do not accommodate roadways separated by a barrier or median in which the roadways are of different elevation. In this instance, the temporary road signs may not be level facilitating reading thereof, or shims are required to level the sign.

U.S. Pat. No. 5,244,172 describes a U-shaped saddle for mounting a post for a sign to a concrete barrier. U.S. Pat. No. 8,230,628 describes a precast concrete road barrier which includes a recessed channel, within and extending lengthwise of the barrier, for receiving a sign. U.S. Pat. No. 4,338,041 describes a glarefoil assembly for mounting to a median barrier.

The above systems rely on the integrity of the permanent concrete median barrier for support and cannot be utilized with steel beam guide rail medians or on shoulders of a roadway. There is a need for a roadway sign base support that does not rely on the integrity of the permanent median barrier for support and may be installed in conjunction with any type of median barrier (including a ditch or the like) and/or installed where a barrier is not present. There is also a need for a support system that may accommodate signs of various sizes. There is also a need for a support system that may accommodate roadways with different elevations.

SUMMARY

According to one aspect, there is provided a support system, preferably for a sign, more preferably for a variable message sign, mountable on at least two foundation members, preferably barriers, preferably two median barriers, preferably each of said foundation members comprising at least one of a barrier wall section, a temporary or permanent barrier, a temporary tall wall barrier, a pre cast concrete, a pile, a screw pile, a helical pile, a rock anchor, a mass of concrete, metal or other material, a ballast system, metal scaffolding/framing capable of supporting a load, and combinations thereof, and in one embodiment further comprising a permanent foundation in combination with any of the above, preferably two longitudinally spaced apart median barriers, said system comprising:

i) a base support having a first end and a second end, preferably being length adjustable, preferably two length adjustable base supports, preferably each of said first end and second end being articulately connectable to a first and second foundation member respectively;

ii) optionally, a central base support, for connecting said two length adjustable base supports;

iii) a vertical support for supporting an item, preferably a sign, said vertical support having a first end and a second end wherein said second end is connectable to said base support; preferably to said central base support; preferably said vertical support being articulately connectable to said base support, preferably to said central base support; in one embodiment, said vertical support is length adjustable;

iv) in one embodiment said base support further comprises a first foundation member bracket for connection to a first foundation member, said first foundation member bracket proximate said first end of said base support; preferably said first length adjustable base support;

v) in another embodiment, said base support further comprises a second foundation member bracket for connection to a second foundation member distant said first foundation member, said second foundation member bracket proximate said second end of said base support; preferably said second length adjustable base support;

vi) in another embodiment, said second base support further comprises a first foundation member bracket for connection to said first foundation member, said first foundation member bracket proximate said first end of said second base support; preferably said second length adjustable base support;

vii) in another embodiment, said second base support further comprises a second foundation member bracket for connection to a second foundation member distant said first foundation member, said second foundation member bracket proximate said second end of said second base support; preferably said second length adjustable base support; preferably each of said foundation member brackets being articulately adjustable and connectable on said respective foundation member; and viii) optionally at least one vertical brace, preferably a length adjustable vertical brace, preferably at least two length adjustable vertical braces, more preferably at least four length adjustable vertical braces, said vertical brace having a first end and a second end; wherein said first end of said vertical brace is connectable, preferably pivotally connectable, to said vertical sign support between said first end and said second end of said vertical sign support; and said second end of said vertical brace is connectable proximate one end of said base support; preferably said second end of said vertical brace is pivotally connectable to at least one of said foundation member brackets.

In one embodiment, said system further comprises a sign, preferably a variable message sign, connectable to said vertical sign support.

In another embodiment, said system may support at least one of the following in addition to the sign and/or independent of said sign, as required:

At least one sensor, preferably selected from a radar based traffic monitoring sensor, Bluetooth vehicle tracking sensor, video detection traffic monitoring sensor, weather station equipment for monitoring at least one of wind, temperature, barometer, humidity, and radar, road temperature sensor, road surface sensor (e.g. ice, oil, etc.), pollution monitoring sensor, a CCTV camera (that may be remotely controlled) and combinations thereof;

At least one communication device, preferably selected from a cellular modem (e.g. 3G or LTE), Bluetooth (near field communications for sign or other device control), wi-fi modem for same as above, satellite cellular modem (for areas outside cell tower range) and combinations thereof.

In yet another embodiment, said system further comprises a power source, preferably a solar panel and battery, for providing power to said sign. In another embodiment, said solar panel is connectable, preferably pivotally connectable proximate said second end of said vertical sign support. In yet another embodiment, said power source may further comprise an alternate power source, preferably comprising a wind turbine generator, preferably to trickle charge the battery when there is insufficient solar power such as through the winter months in climactic regions where there is less sunlight hours and intensity in winter months, a generator, preferably a propane, gas or diesel generator, a fuel cell, preferably a hydrogen or other type of fuel cell. In yet another embodiment, said solar panel further comprises an actuated solar tracking system.

Preferably said system further comprises a controller for controlling at least one of the following: message on said sign, power to said sign, data transmission and reception from and to said system and combinations thereof.

In one embodiment, said system, may accommodate median barriers of various sizes, shapes and widths as well as accommodate median barriers longitudinally spaced apart from each other at various distances.

In one embodiment, said first end of said at least one vertical brace is movably connected to said vertical sign support, preferably movably connected via a collar, preferably sliding adjustable, running along the vertical sign support. In another embodiment, said vertical brace is a cable or the like.

In one embodiment, each of said base support is length adjustable, preferably telescopically adjustable with at least one stop for fixing the length of said base at a desired length.

In one embodiment, each of said foundation member brackets further comprise at least one connector, preferably a plurality of connectors for securely connecting said brackets to said foundation members. The at least one connector preferably to removably secure said brackets to said foundation members. Preferably said at least one connector is an anchoring device for anchoring to said foundation member, preferably a threaded rod running through each of said foundation member bracket. Preferably each of said foundation member bracket is articulately connectable to a side of a foundation member.

In another embodiment the system further comprises at least two barriers, preferably at least two temporary concrete barriers. In another embodiment, the system further comprises at least one permanent barrier and one temporary barrier.

Although any suitable material that will meet the requirements of the specific situation, the preferred material to be used for the brackets, base support, central support and vertical support, and vertical brace is steel (galvanized or painted).

An alternative material is aluminum, stainless steel and combinations of all these materials.

A preferred connector for the brackets include anchors or bolts drilled into or through the foundation member, clamped to utilize friction forces and combinations thereof.

According to another aspect, there is provided a method of mounting a vertical support for a sign to at least two spaced apart foundation members, preferably two spaced apart median barriers, more preferably two longitudinally spaced apart concrete barriers, even more preferably of mounting a support system as disclosed herein, comprising the steps of:

i) anchoring at least one support bracket to each spaced apart foundation member;
ii) mounting, preferably articulately mounting at least one base support, preferably a length adjustable base support having two ends, preferably two length adjustable base supports separated by a central base support, to said at least one support bracket;
iii) attaching, preferably articulately attaching, a vertical support to said base support, preferably to said central base support;
iv) levelling said vertical support;
v) attaching said sign to said vertical support;
vi) attaching a solar panel to said vertical support;
vii) orienting said sign and said solar panel as required; and
viii) tightening attachments ensuring a secure connection.

In one embodiment, the solar panel is connected directly to the sign. In another embodiment, the solar panel is connected to the battery and the battery is connected to the sign. In yet another embodiment, the solar panel is connected to the battery, the battery is connected to the controller and the controller is connected to the sign.

These and other objects will become more apparent from the accompanying figures in the following detailed description.

BRIEF DESCRIPTION OF THE FIGURES

FIG. 5a depicts the vertical brace in a preferred embodiment.

FIG. 5b depicts a perspective view of the collar for the brace of FIG. 5a.

DETAILED DESCRIPTION

Figure 1:
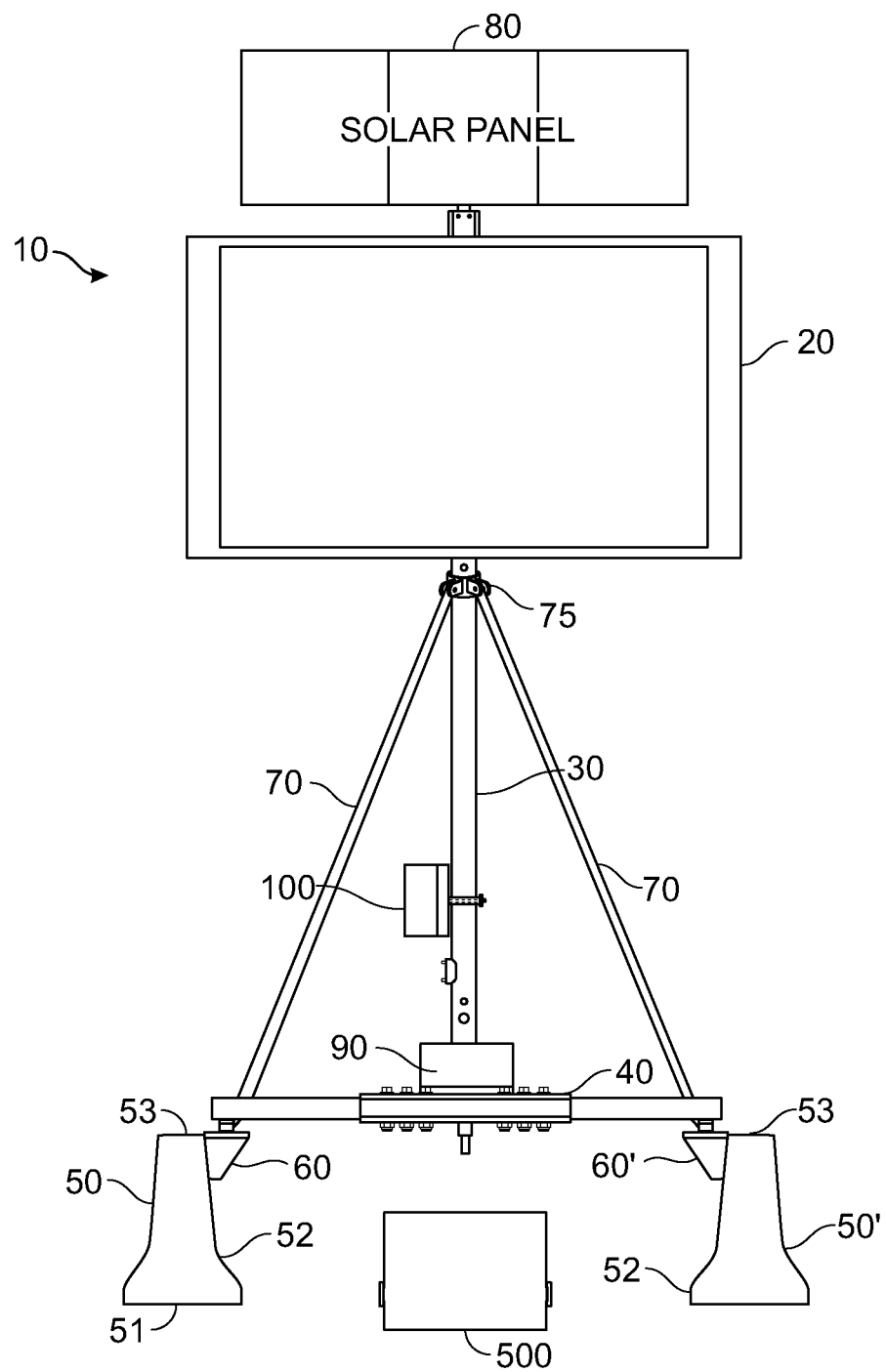
FIG. 1 is a front view of the system in a preferred embodiment.
Figure 2:
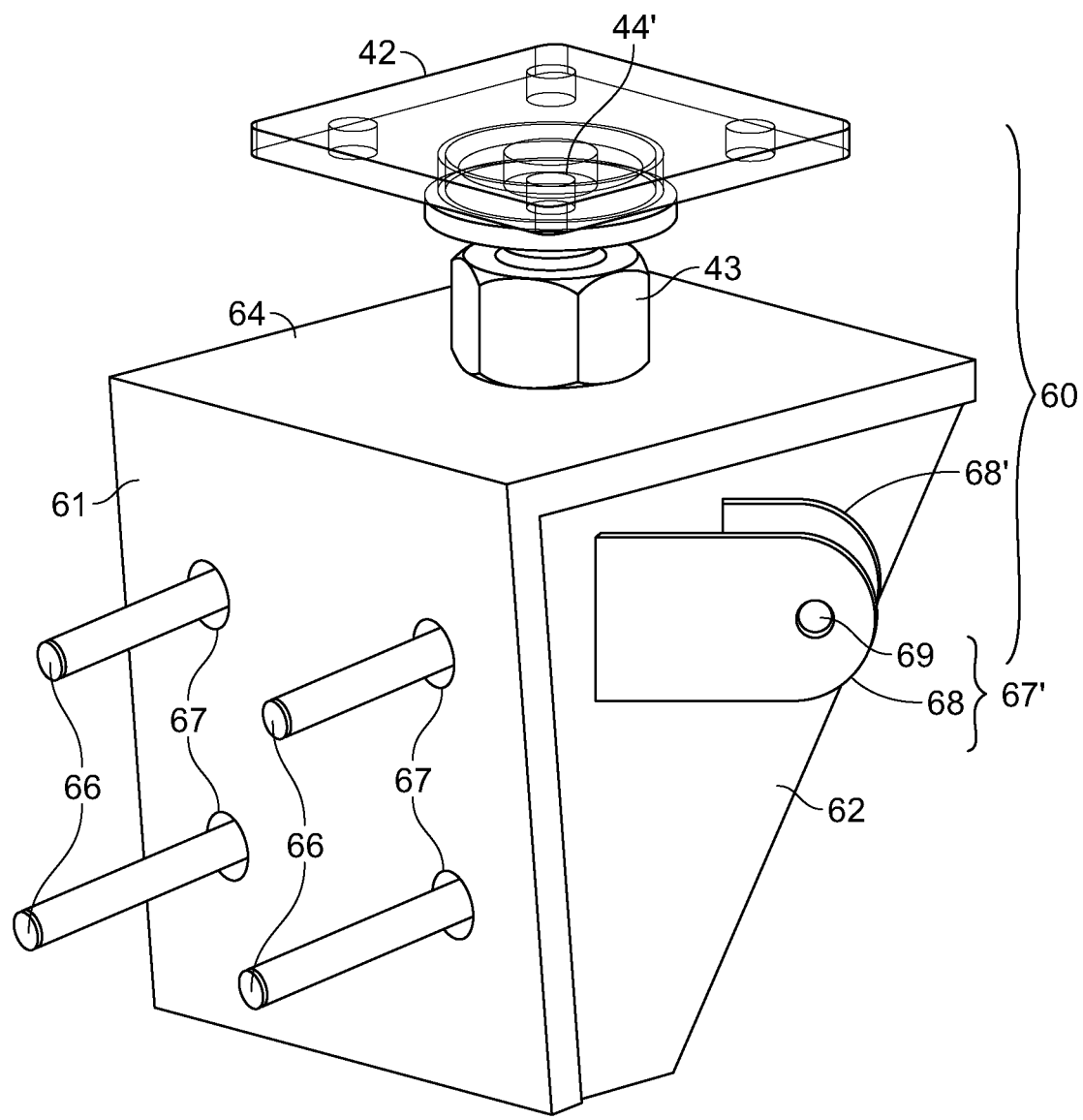
FIG. 2 is a perspective view of the bracket in a preferred embodiment.
Figure 2A:
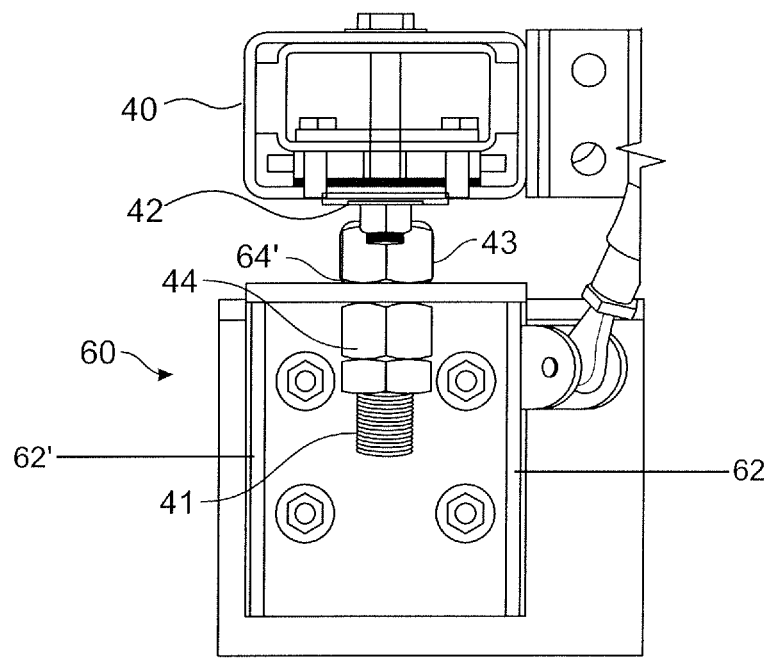
FIG. 2a is a front view of the bracket of FIG. 2.
Figure 2B:
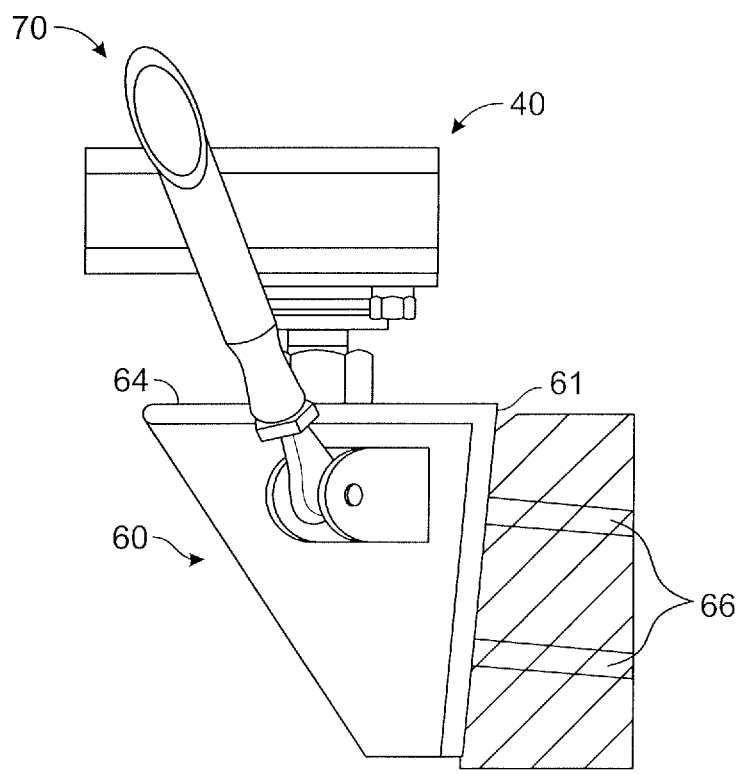
FIG. 2b is a side view of the bracket of FIG. 2.
Figure 2C:
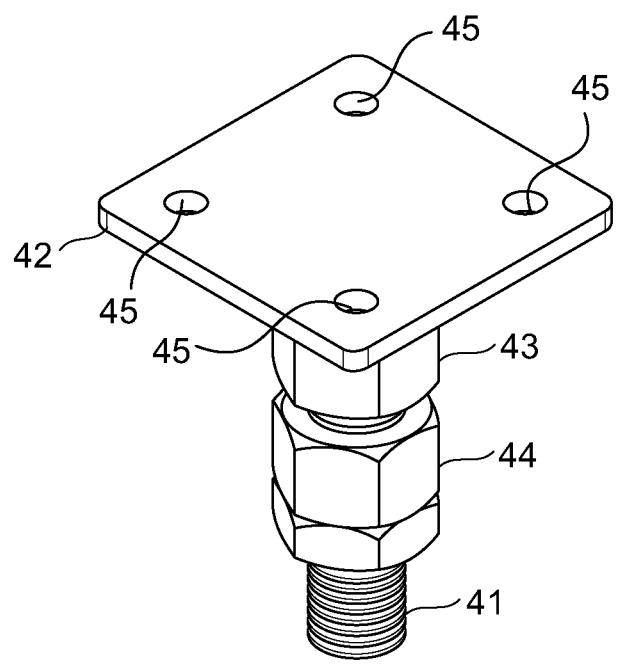
FIG. 2c is a perspective view of the articulating plate in a preferred embodiment.
Figure 2D:
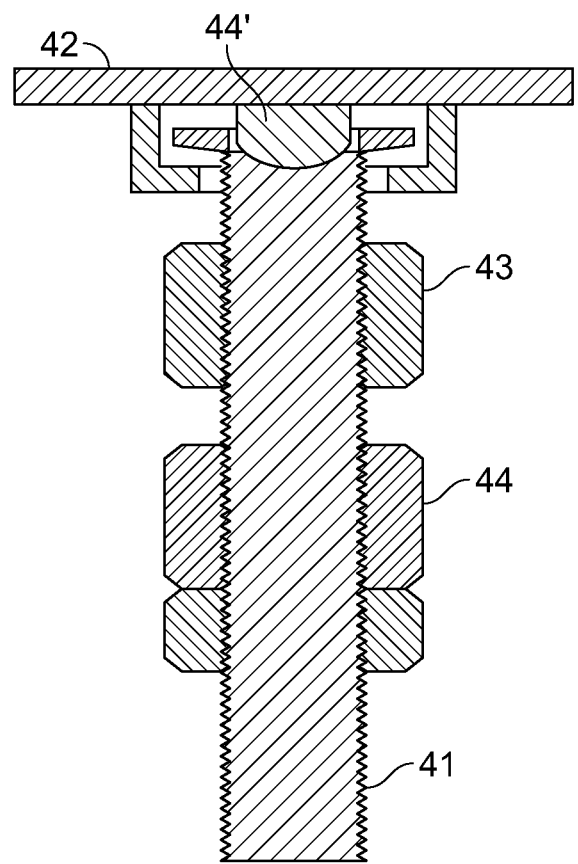
FIG. 2d is a cross sectional view of the plate of FIG. 2c.
Figure 3:
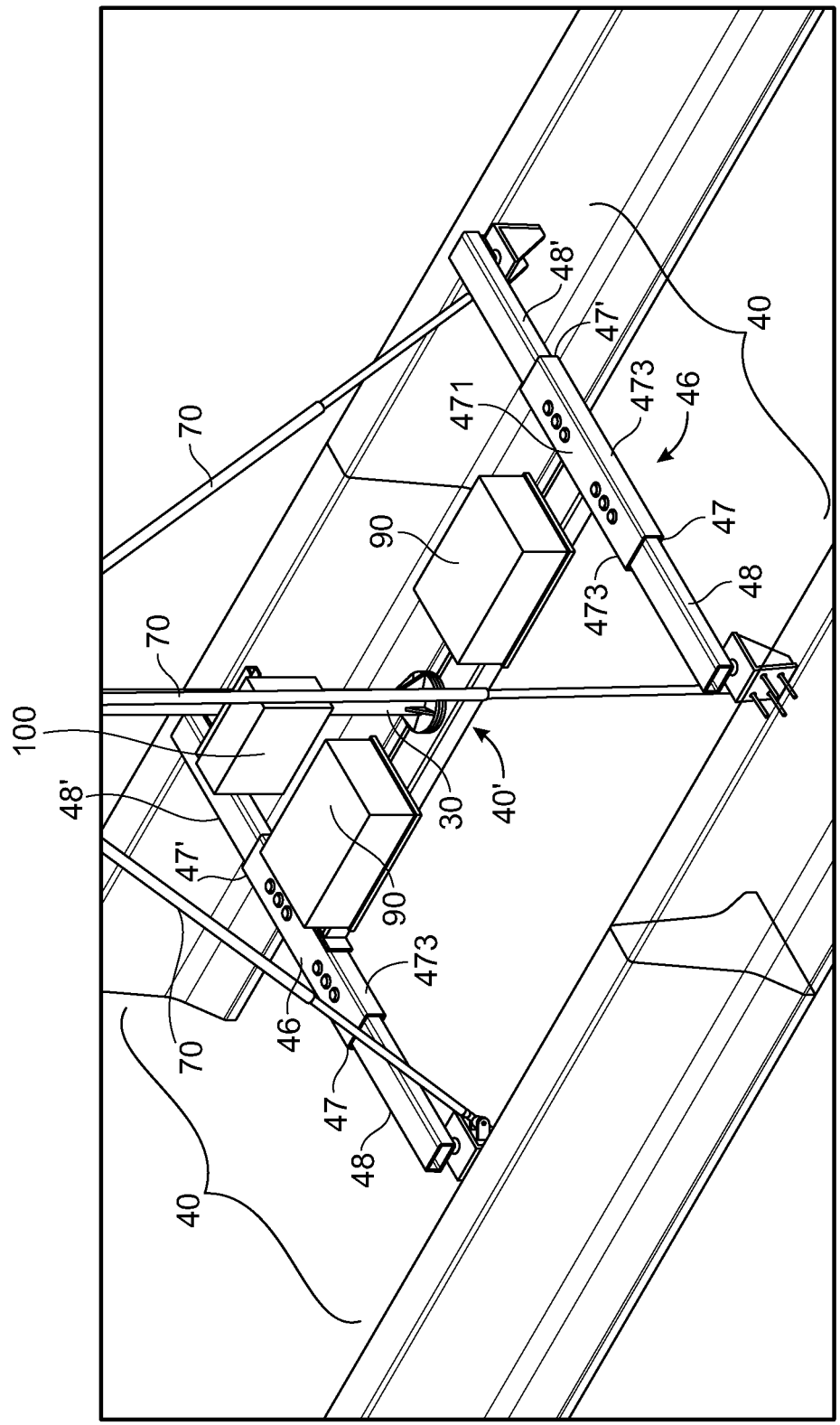
FIG. 3 is a perspective view of the system of FIG. 1.
Figure 3A:
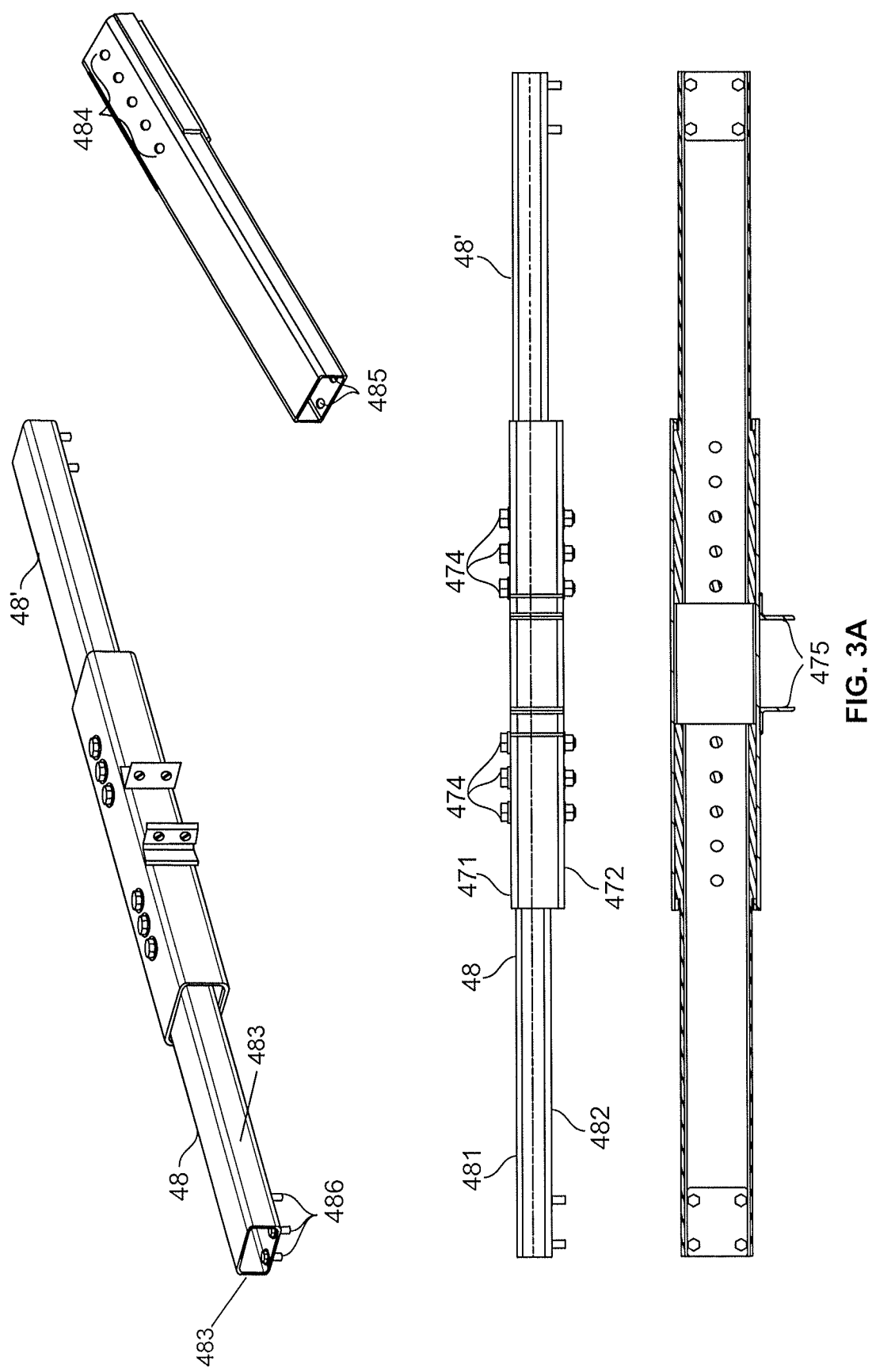
FIG. 3a depicts the base support in a preferred embodiment.
Figure 4:
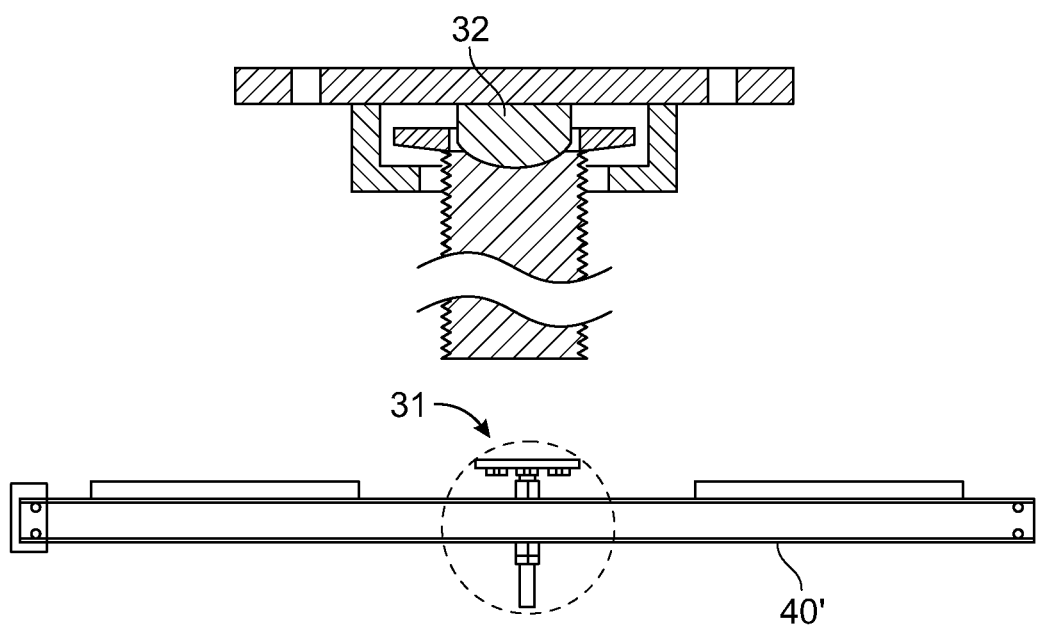
FIG. 4 depicts the central support and articulating joint of the central support in a preferred embodiment.
Figure 4A:
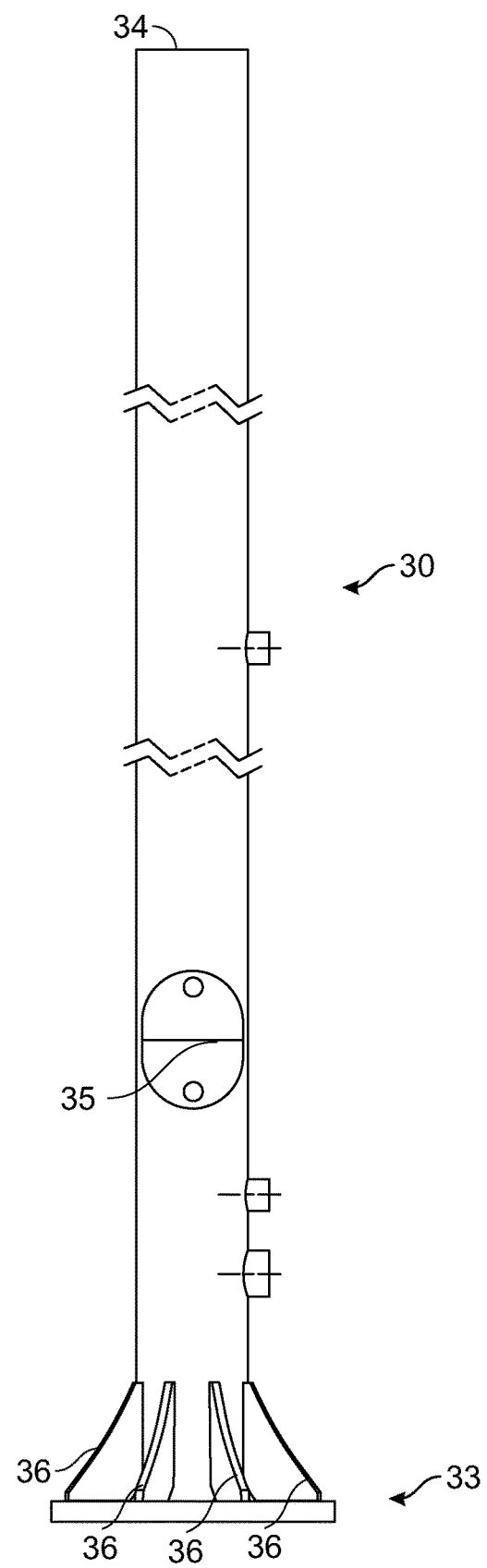
FIG. 4a depicts the central support in a preferred embodiment.

Referring now to FIG. 1, a temporary sign support system is indicated generally at 10. The system 10 comprises a sign 20, a vertical support 30 (fixed in length in this embodiment but may be adjustable in length), a horizontal base 40, connected to concrete barriers 50, 50' via support brackets 60, 60'. The system includes an optional vertical brace 70. The system further comprises a solar panel 80, a battery box 90 (in this embodiment two battery boxes) and a controller 100. The concrete barriers 50, 50' are of the type used to protect a work site as well as redirecting traffic flow during construction or accidents or the like. The concrete barriers 50, 50' allow for the support system 10 to straddle an existing permanent median 500, which divides two traffic roadways, typically two roadways of opposing traffic flow, which may be a concrete median, a steel median, a ditch, or the like. Although depicted here using two temporary concrete barriers, the support system may be used with two permanent barriers, or a combination of a temporary and permanent barrier or a combination of any foundation member. Each concrete barrier 50 (and 50') has a wide base 51 and walls 52 that taper upward to a narrow flat top 53. The base 51 is typically 800 mm in length and the height is typically 1125 mm. As best seen in FIGS. 2, 2a and 2b, the support bracket (60, 60') is used to connect the system 10 to the concrete barriers 50, 50' are depicted. FIG. 2 is a perspective view, FIG. 2a is a front view and FIG. 2b is a side view. Also depicted in FIGS. 2a and 2b are the vertical braces 70 and horizontal base 40 attached to the support bracket 60. The support bracket 60 has a back 61 two sides 62, 62' and a top 64. Four threaded rods 66 are shown going through the threaded rod apertures 67 which run through the back 61 of the support bracket 60 in a slightly angled horizontal plane to assist in the securement of the bracket 60 onto the wall 52 proximate the top 53 of the concrete barrier 50. The threaded rods 66 are preferably ASTM A193 grade B7, but any suitable material may be used. The support bracket 60 may be made of steel, however any suitable material may be chosen. Bracket 60 includes on top 64, an aperture 64' to receive the horizontal base 40. In particular, a threaded rod 41, with a articulately connected base plate 42 at one end of said threaded rod, is attached to said bracket top 64 via said aperture 64'. In this instance, the aperture is threaded to complement and securely receive the threaded rod 41. The threaded rod 41 is further secured onto the top 64 of the bracket 60, by the placement of a hex nut 43 on the threaded rod 41 above the top 64 and a hex nut 44 on the threaded rod 41 below the top 64, such that the hex nuts 43, 44 are tightened on said threaded rod 41 such that the threaded rod 41 is securely attached to the bracket 60. The base plate 42 is square in shape and is articulately connected to said threaded rod 41 by a ball joint 44, allowing the base plate 42 to articulate on said threaded rod 41 allowing for any angular adjustment of said horizontal base 40, when connected onto the wall 52 of the concrete barriers 50, 50'. The preferred material for the ball joint 44 is AISA 4140 Alloy Steel (Fy=415 MPa) but any suitable material may be used. The base plate 42 further comprises four apertures 45 to receive the horizontal base 40. The preferred material for the base plate 42 is steel but any suitable material may be used. Referring now to FIGS. 3 and 3a, Horizontal base 40, in this embodiment, includes a pair of end supports comprising of rectangular hollow shaped central portion 46 with two ends 47, 47', a top 471, bottom 472 and two sides 473, and a central support 40' connecting the pair of end supports. The central portion 46 includes a plurality of spaced apart apertures 474 aligned and running through said top 471 and bottom 472. Each end 47, 47' receives a rectangular hollow shaped end portion 48, 48'. Each end portion 48, 48' include a top 481, bottom 482 and two sides 483. Each end portion 48, 48' comprise a plurality of spaced apart apertures 484 aligned and running through said top 481 and bottom 482. As best seen in FIG. 3a, each end portion 48, 48' are received by the central portion 46 and connected to each other via hex bolts running through apertures 474 and 484. As can be seen, in this embodiment, end portions include more apertures than the central portion. This allows for adjusting the length of the horizontal base 40 as needed, accommodating barriers that are separated at various distances from each other. In another embodiment, end portions 48, 48' may be of different lengths to further accommodate various lengths. In yet another embodiment end portions 48, 48' of various lengths, along with apertures 474 and 484 spaced apart at various intervals, along with shims and/or shim plates may be used in combination to accommodate barriers separated at various distances. End portions include at one end thereof, distant the apertures 484, base plate connector apertures 485 for alignment with apertures 45 of said base plate 42. In this embodiment four hex bolts 486 are used to connect the horizontal base 40 to said support bracket 60, 60'. On one side 473 of central portion 46, are two spaced apart steel plates 475 to receive the central support 40' that receives vertical support 30, via a vertical support connector 31, as best seen in FIG. 4. In this embodiment, vertical support connector 31 comprises a ball swivel joint 32 similar to the ball joint 44 described above. As best seen in FIG. 4a, vertical support 30, comprises a steel column having a base 33 and a top 34. Base 33 is connected to the ball swivel joint 32 which in turn is connected to the central support 40'. Proximate the base thereof, vertical support 30 further comprises a hand hole 35 to facilitate movement during installation and deinstallation of said system as well as facilitate running any wires through the vertical support 30 as needed. Said vertical support base 33 is comprised of a plurality of vertically oriented reinforcement ribs 36 which further enhance rigidity. Support bracket 60 includes on side 62 a vertical brace connector 67. In this embodiment the vertical brace connector 67 is a pair of spaced apart plates 68, 68' to receive the vertical brace 70. Each plate 68, 68' includes an aperture 69, 69' for pivotally receiving the vertical brace 70.

Figures 5A, 5B:
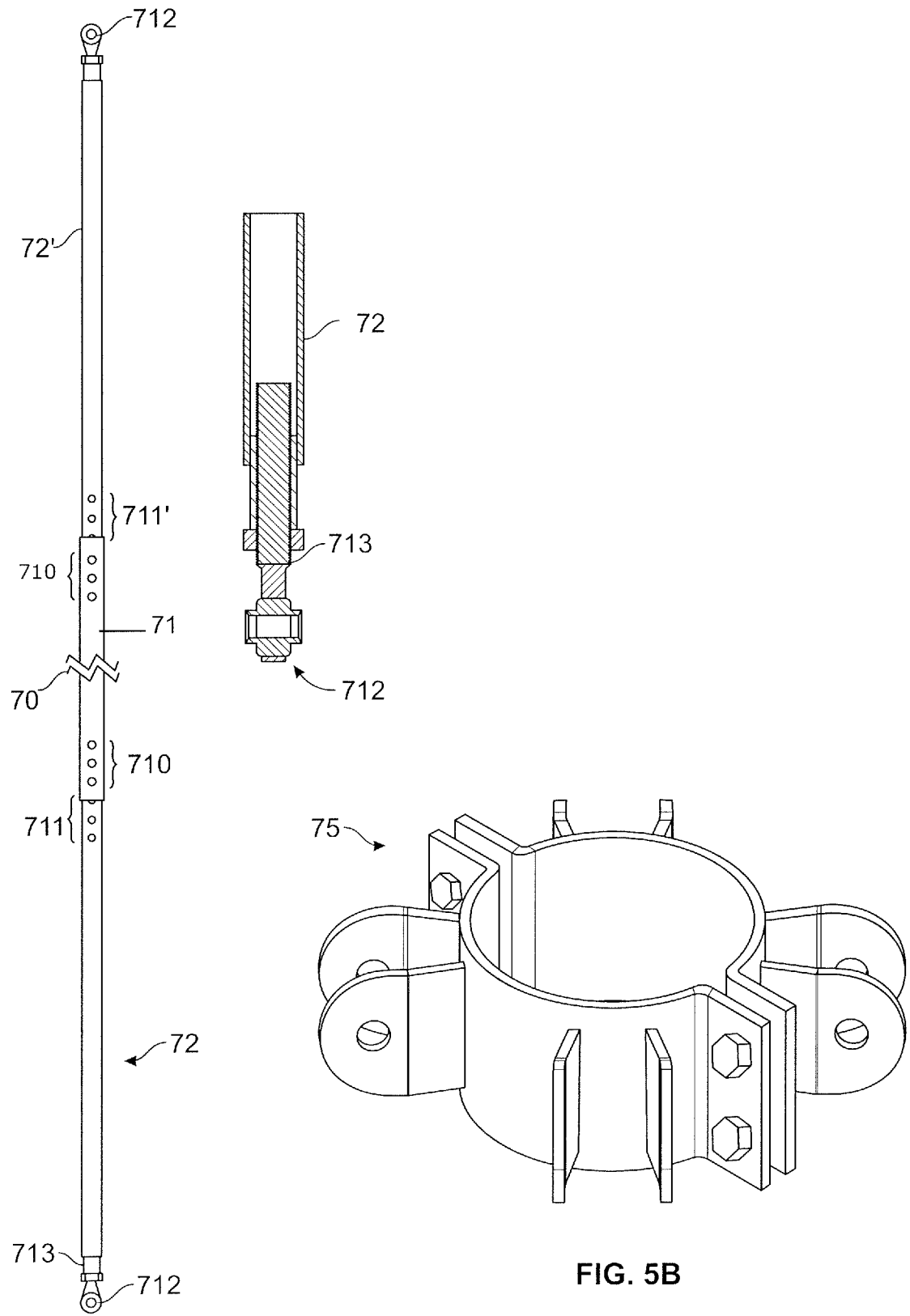
Figure 5C:
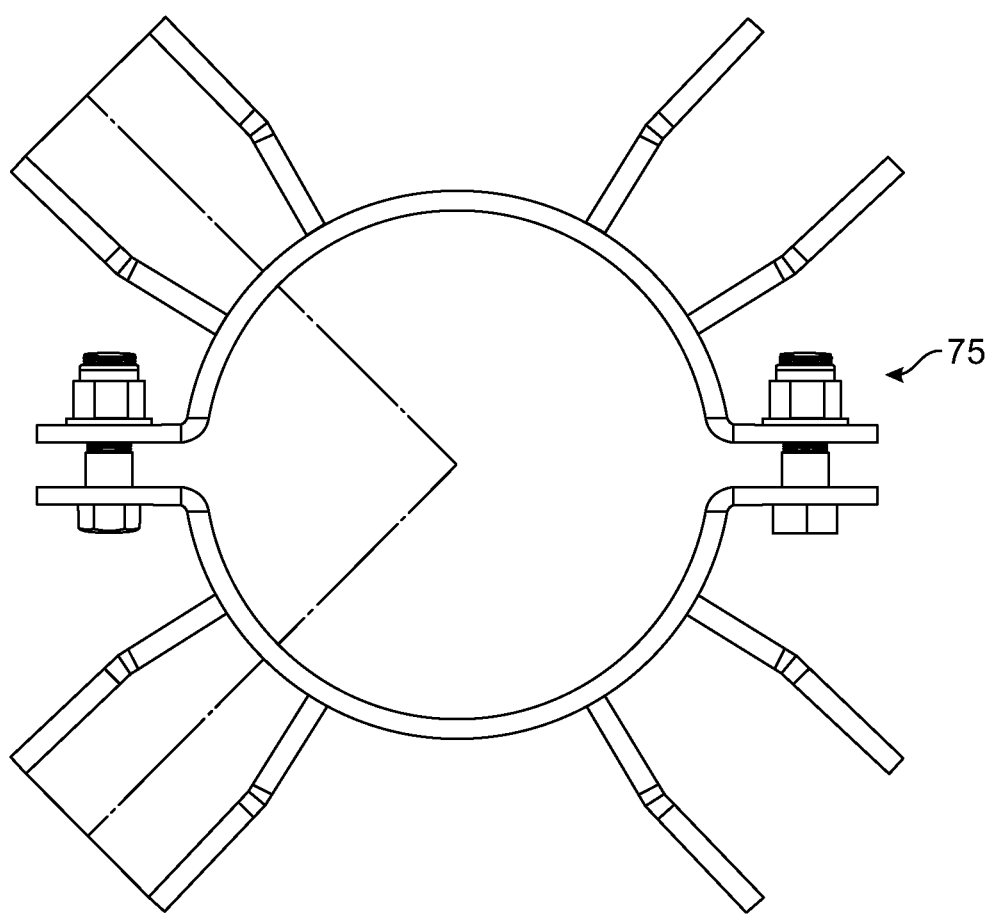
FIG. 5c depicts an overhead view of the collar of FIG. 5b.
Figure 6:
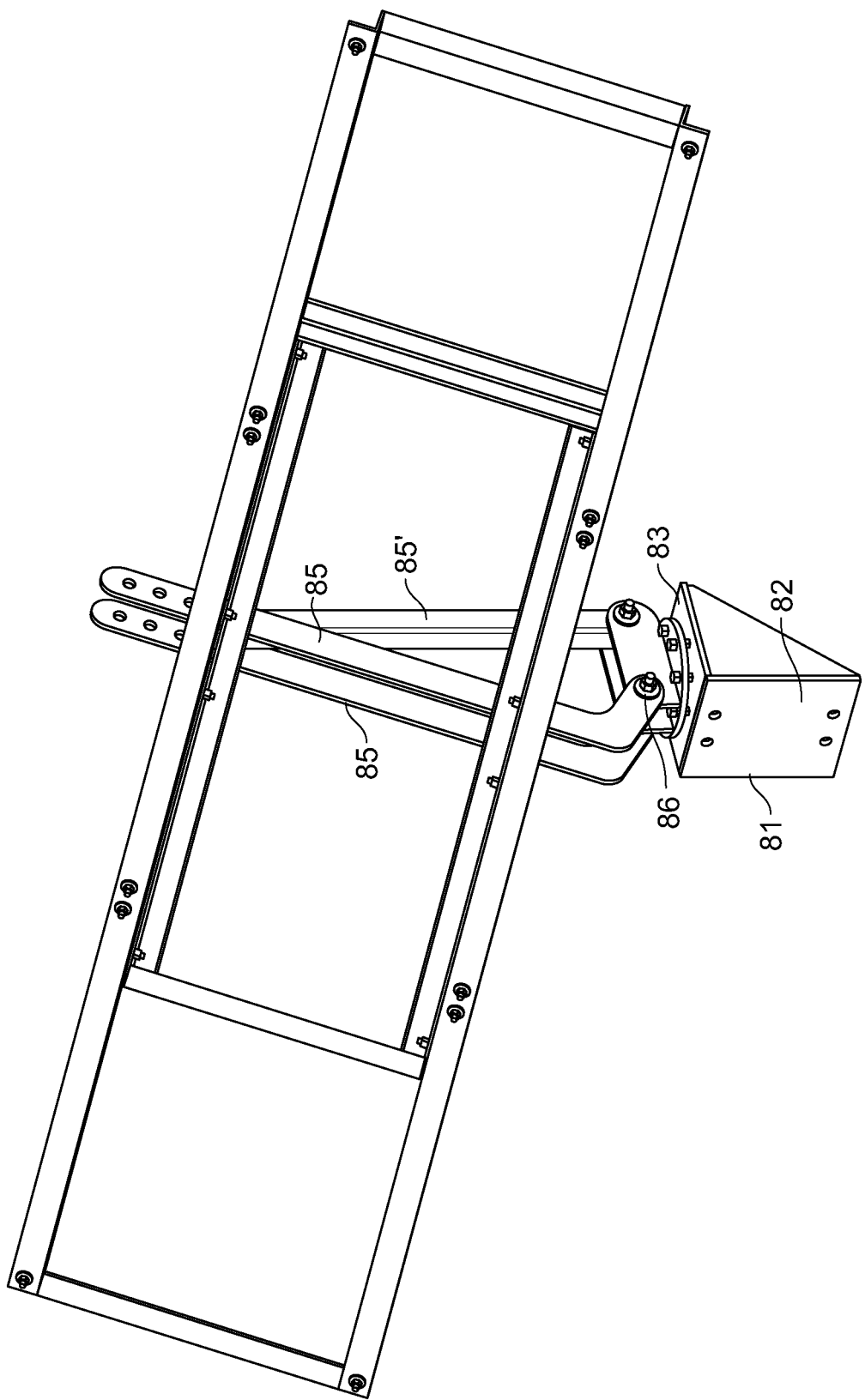
FIG. 6 depicts the solar panel and associated connections of the system in a preferred embodiment.
Figure 6A:
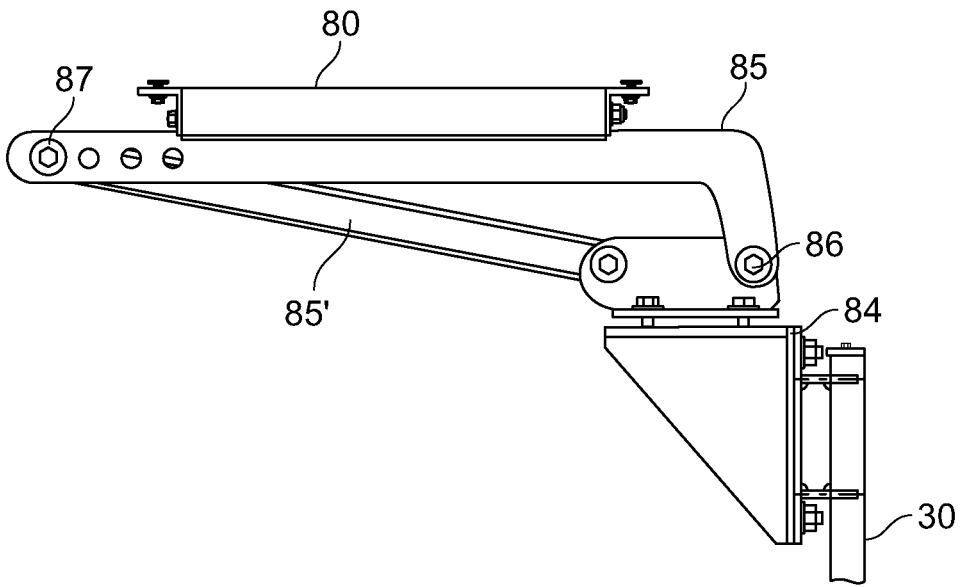
FIG. 6a depicts the pivotal arms of the solar panel in a first position.
Figure 6B:
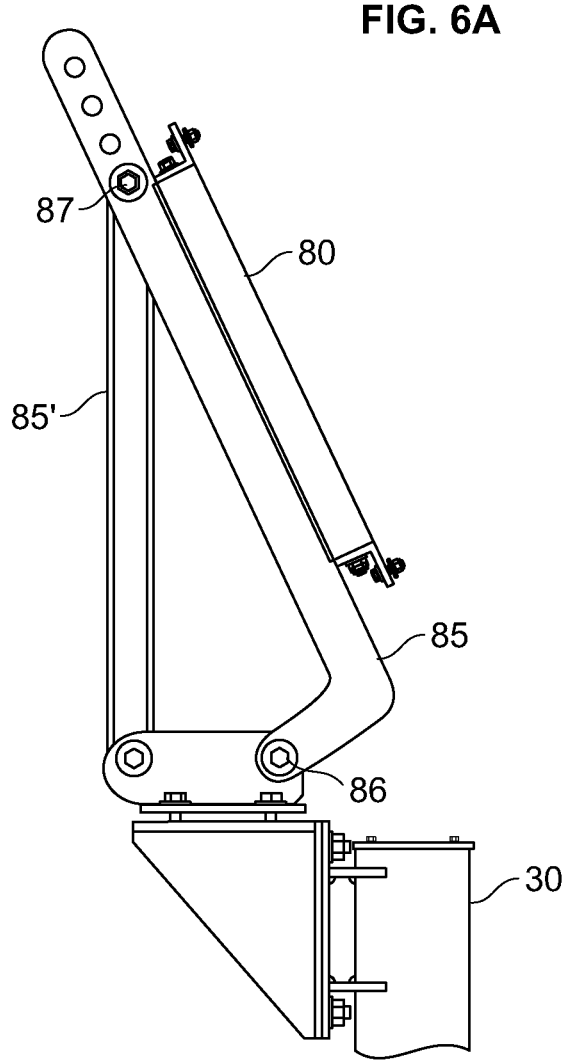
FIG. 6b depicts the pivotal arms of the solar panel in a second position.
Figure 7:
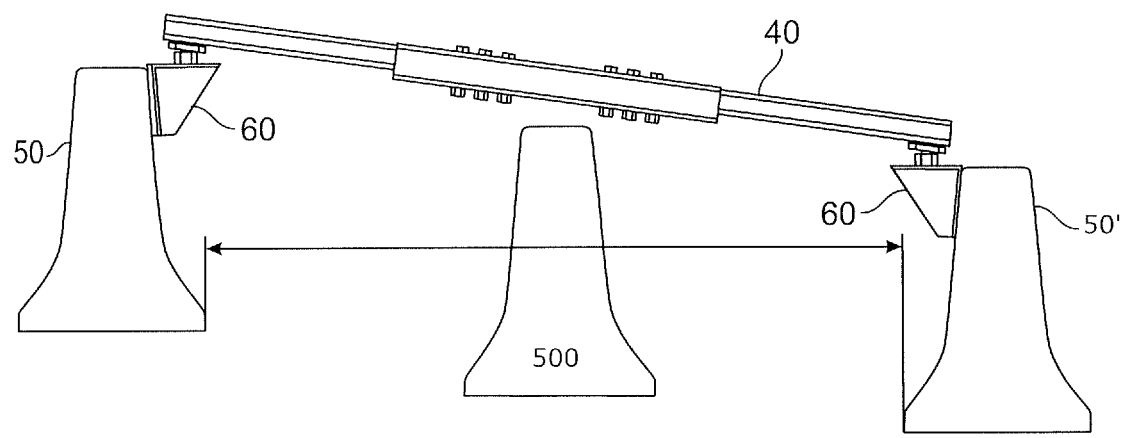
FIG. 7 depicts the base support of the present system when used with roadways of different elevations.

Referring now to FIG. 5a, Vertical brace 70 comprises a central portion 71 and two adjustable end portions 72, 72'. Central portion 71 includes a plurality of spaced apart apertures 710 running along the length of said central portion. Each of said adjustable end portions 72, 72' include a plurality of spaced apart apertures 711, 711' running along the length thereof. Depending on the desired length of the vertical brace 70, apertures 710 are aligned with apertures 711, 711' and end portions 72, 72' are connected to the central portion 71 via a clevis pin (not shown), preferably with a reusable cotter pin (not shown). However, other connectors may be used. In one embodiment, each of said vertical brace comprises a pivotal connector, preferably a end tie rod 712 proximate the ends thereof. One for connection to said support bracket 60 and another for connection to said vertical support 30. The end tie rod 712, in this embodiment, is threaded at one end 713 which threads into a threaded end of the vertical brace 70, allowing for further adjustment of the length of the vertical brace 60. Preferably said vertical brace 70 is connected to said vertical support 30 via a collar 75 (as best seen in FIGS. 5a and 5b) on said vertical support 30. Collar 75 is preferably adjustable along the length of said vertical support 30. The adjustable lengths of the horizontal base and the vertical brace 70, together with the ball joints of the vertical support and the horizontal base allows for the system to accommodate situations where the concrete barriers are at different heights, whilst allowing for the sign 20 to be readable and maintained in a substantially level position. In this embodiment, there are four vertical braces 70, although there may be none or at least one. Sign 20 is connected to said vertical support 30, above said collar 75, by a sign support collar (not shown), or by any suitable means. Referring now to FIGS. 6, 6a and 6b, Solar panel 80 is attached proximate the top of said vertical support 30. Preferably said solar panel 80 is pivotally attached to said vertical support 30, to allow for angular adjustment of said solar panel allowing for optimal orientation for solar energy capture. The preferred range of angular adjustment is between 0 to 65 degrees relative to horizontal. In a preferred embodiment, the solar panel 80 is attached proximate the vertical support by a solar panel bracket 81, preferably a 90 degree bracket with a back 82 and a top 83. The back 82 is attached to the vertical support by four hex bolts received in a solar panel bracket plate 84 attached to the vertical support 30. The solar panel is attached to the top 83 of the solar panel bracket 81 by a hinged arm 85. Hinged arm 85 has a first end 86 and a second end 87. The first end 86 is pivotally connected to the top 83 of the bracket 81. In this embodiment, there is a second hinged arm 85' pivotally connected to the top of the bracket 81 but distant the pivotal connection of the first hinged arm 85. The second end 87 of both arms 85, 85' are pivotally connected to each other. The solar panel 80 is connected along the length of arm 85, such that when the first end 86 of arms 85,85' pivot, the solar panel 80 moves angularly, preferably between 0 and 65 degrees. When arm 85 is 65 degrees from horizontal, arm 85' is 90 degrees from horizontal. The system 10 further comprises at least one battery box 90, preferably two battery boxes for storing energy captured by the solar panel 80 and powering the controller 100 and sign 20. Controller 100 provides a control of the message on the sign 20 as well as any other parameters as needed. The controller also provides regulated power to the sign 20, and may also record and transmit data related to the system. Referring now to FIG. 7, the system 10 is shown in use when there are two roadways of different elevations separated by a permanent median 500. In this instance, the base 40 is adjustably connected at a 10° differential in elevation at one end of the temporary barriers 50, 50' and the center line of the central support 30 is at 80° to allow for the central support and the sign to be level for the viewer to be able to read the sign. If needed, additional shim plates may be used between the barriers 50, 50' and the brackets As many changes can be made to the preferred embodiment without departing from the scope thereof; it is intended that all matter contained herein be considered illustrative and not in a limiting sense.

The invention claimed is:

1. A sign support system, said system being mountable on at least two spaced apart foundation members, said system comprising:
   i) at least one sign;
   ii) a base support having a first end and a second end, each of said first end and second end being articulately connectable to a first foundation member and a second foundation member respectively;
   iii) a vertical support for supporting said sign, said vertical support having
      a first end and a second end wherein said second end is connectable to said base support;
      and
   iv) optionally at least one vertical brace, said vertical brace having a first end and a second end; wherein said first end of said vertical brace is connectable to said vertical support between said first end and said second end of said vertical support; and said second end of said vertical brace is connectable proximate one end of said base support, wherein said at least one vertical brace being at least one of: (a) length adjustable, (b) pivotally connectable to said vertical support and (c) combinations thereof.

2. The support system of claim 1 wherein said base support is length adjustable.

3. The support system of claim 1 or 2 wherein said base support further comprises two base supports connectable to each other by a central base support.

4. The support system of claim 1 wherein said vertical support is articulately mounted on said base support.

5. The support system of claim 1 wherein said vertical support is articulately mounted on said central base support.

6. The support system of claim 1 wherein said vertical support is height adjustable.

7. The support system of claim 1 wherein said base support further comprises:
   i) a first foundation member bracket for connection to a first foundation member, said first foundation member bracket proximate said first end of said base support;
   ii) a second foundation member bracket for connection to a second foundation member distant said first foundation member, said second foundation member bracket proximate said second end of said base support.

8. The support system of claim 3 wherein each of said two base supports further comprises:
   i) a first foundation member bracket for connection to a first foundation member, said first foundation member bracket proximate said first end of a first base support;
   ii) a second foundation member bracket for connection to a second foundation member distant said first foundation member, said second foundation member bracket proximate said second end of said first base support;
   iii) a third foundation member bracket for connection to said first foundation member, said third foundation member bracket proximate said first end of said second base support; and
   iv) a fourth foundation member bracket for connection to said second foundation member, said fourth foundation member bracket proximate said second end of said second base support.

9. The system of claim 1 further comprising at least one of: a radar based traffic monitoring sensor, a Bluetooth vehicle tracking sensor, a video detection traffic monitoring sensor, weather station equipment for monitoring at least one of wind, temperature, barometer, humidity, and radar, a road temperature sensor, a road surface sensor, a pollution monitoring sensor, a CCTV camera, at least one communication device, selected from a cellular modem, a Bluetooth, a wi-fi modem, a satellite cellular modem, and combinations thereof.

10. The system of claim 1 further comprising a power source.

11. The system of claim 10 wherein said power source comprises at least one of a solar panel, a battery, a wind turbine generator, a generator, selected from a propane, gas or diesel generator, a fuel cell, selected from a hydrogen or other type of fuel cell, and combinations thereof.

12. The system of claim 1 further comprising a controller.

13. The system of claim 1 wherein said sign comprises a variable message sign.

14. A method of mounting the system of claim 1, said method comprising:
   i) anchoring at least one foundation member bracket, to each spaced apart foundation member;
   ii) mounting, said each of said ends of said two length adjustable base supports to a respective foundation member bracket;
   iii) connecting said base supports to each other with a central base support;
   iv) attaching, a vertical support to said central base support;
   v) optionally attaching at least one vertical brace to said vertical support;
   vi) levelling said vertical support;
   vii) attaching a sign to said vertical support;
   viii) attaching a solar panel to said vertical support;
   ix) orienting said sign and said solar panel as required; and
   x) tightening any connections and attachments ensuring a secure connection.

15. The system of claim 9 wherein said CCTV camera is remotely controlled, said Bluetooth comprises near-field communications for sign or other device control and wherein said satellite cellular modem is configured for communication for areas outside cell tower range.

* * * * *